(12) United States Patent
Zink et al.

(10) Patent No.: US 12,154,202 B1
(45) Date of Patent: Nov. 26, 2024

(54) SYSTEM AND METHOD FOR DIGITAL BRANDING OF LOTTERY TICKETS

(71) Applicant: Scientific Games, LLC, Alpharetta, GA (US)

(72) Inventors: Thomas Zink, Constance (DE); Alwin Brakebusch, Constance (DE)

(73) Assignee: Scientific Games, LLC, Alpharetta, GA (US)

( * ) Notice: Subject to any disclaimer, the term of this patent is extended or adjusted under 35 U.S.C. 154(b) by 0 days.

(21) Appl. No.: 18/484,689

(22) Filed: Oct. 11, 2023

(51) Int. Cl.
| | | |
|---|---|---|
| *G06T 11/60* | (2006.01) | |
| *A63F 3/06* | (2006.01) | |
| *G06Q 50/34* | (2012.01) | |
| *H04N 1/00* | (2006.01) | |

(52) U.S. Cl.
CPC .............. *G06T 11/60* (2013.01); *A63F 3/065* (2013.01); *G06Q 50/34* (2013.01); *H04N 1/00238* (2013.01); *H04N 1/00251* (2013.01); *A63F 3/0605* (2013.01); *G06T 2200/24* (2013.01)

(58) Field of Classification Search
CPC ...... G06T 11/60; G06T 2200/24; A63F 3/065; A63F 3/0605; G06Q 50/34; H04N 1/00238; H04N 1/00251
USPC ........................................................ 382/313
See application file for complete search history.

(56) References Cited

U.S. PATENT DOCUMENTS

| | | | |
|---|---|---|---|
| 5,682,819 A | 11/1997 | Beaty | |
| 6,155,491 A * | 12/2000 | Dueker | G06K 17/0032 235/440 |
| 6,186,404 B1 * | 2/2001 | Ehrhart | A63F 3/065 283/85 |
| 6,234,899 B1 | 5/2001 | Nulph | |
| 6,650,427 B2 | 11/2003 | Brooks et al. | |
| 6,732,916 B1 | 5/2004 | Fazzano | |
| 6,760,476 B2 * | 7/2004 | Meder | G07C 15/006 382/181 |
| 2004/0085590 A1 * | 5/2004 | Thiessen | G06K 15/02 358/1.11 |
| 2006/0170951 A1 * | 8/2006 | Jia | B41M 3/14 358/1.14 |
| 2009/0065574 A9 * | 3/2009 | Behm | A23J 3/14 463/16 |
| 2009/0287580 A1 * | 11/2009 | Irwin, Jr. | A63F 3/0665 705/400 |
| 2011/0127332 A1 * | 6/2011 | Finnerty | G06K 7/143 235/462.01 |
| 2012/0224790 A1 * | 9/2012 | Lee | G06V 10/17 382/312 |
| 2018/0190073 A1 * | 7/2018 | Ghia | G07F 17/3253 |
| 2019/0073652 A1 * | 3/2019 | Garrison | G06Q 20/208 |
| 2020/0193564 A1 * | 6/2020 | Rasheed | G06T 3/4038 |

* cited by examiner

*Primary Examiner* — Negussie Worku
(74) *Attorney, Agent, or Firm* — Dority & Manning, P.A.

(57) ABSTRACT

A method and system generate an image of a lottery ticket with a branding mark indicating that the lottery ticket was presented for redemption and is thereafter void, wherein the lottery ticket is presented by a patron at a terminal having a digital image capture device. At the terminal, a digital image of the lottery ticket is generated with the digital image capture device and presented on a display. The image is modified on the display to include a branding mark indicating that the lottery ticket has been presented for redemption and is thereafter void. At the terminal, a copy of the modified digital image of the lottery ticket is printed and presented to the patron.

14 Claims, 5 Drawing Sheets

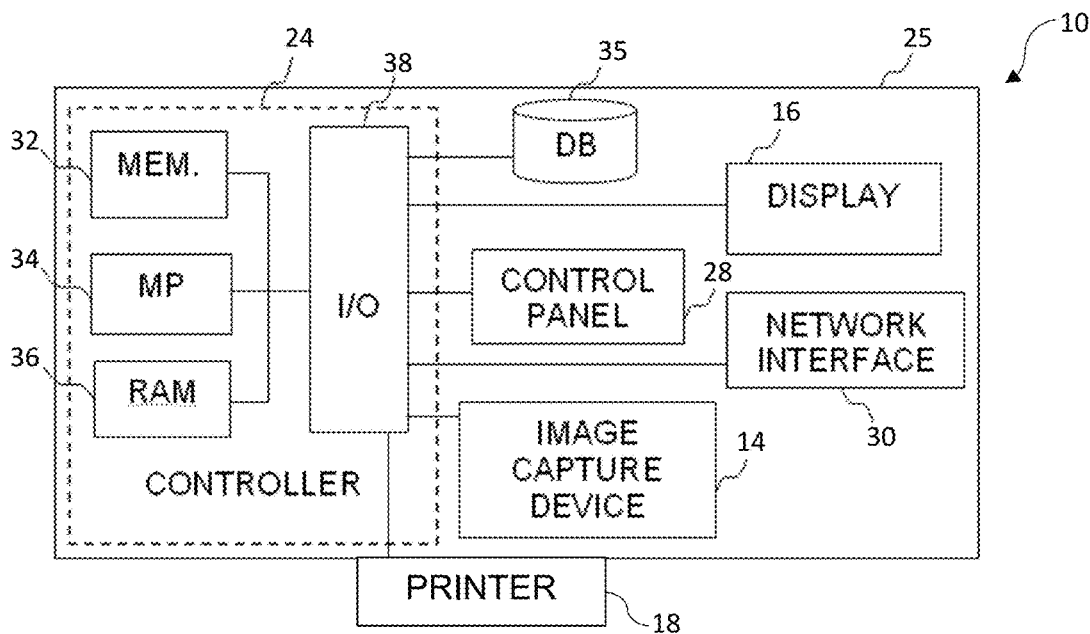
Fig. 3
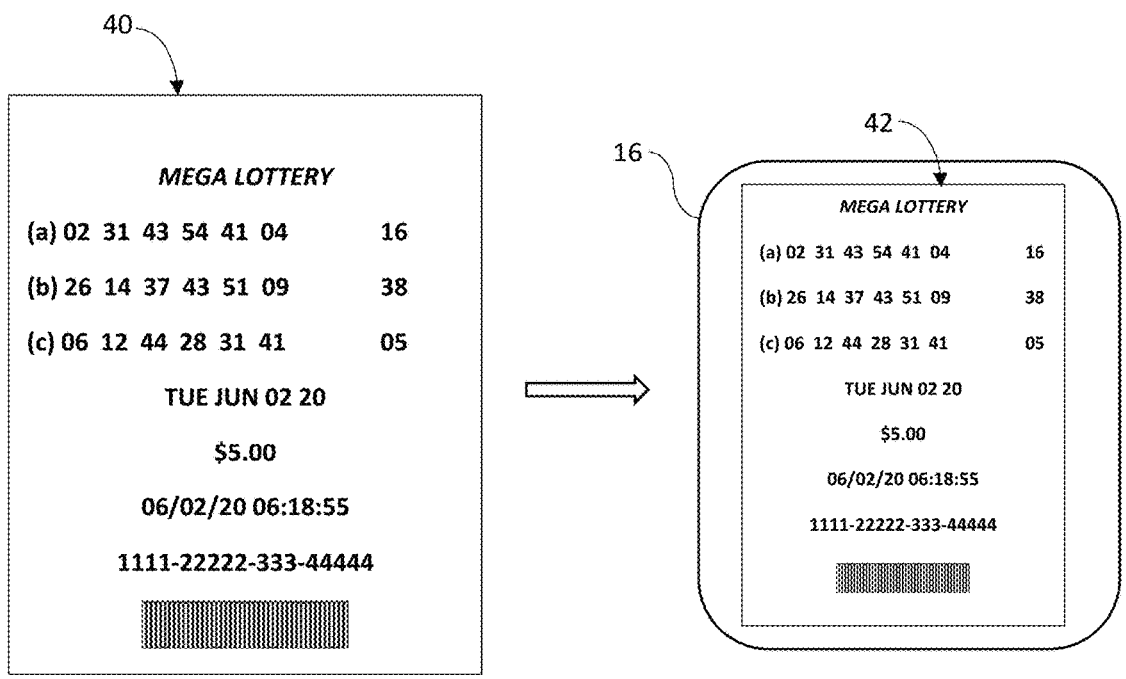
Fig. 4A                    Fig. 4B

SYSTEM AND METHOD FOR DIGITAL BRANDING OF LOTTERY TICKETS

BACKGROUND

It is common practice in many lotteries to "brand" a lottery ticket that has been presented by a player for redemption. Typically, a mark such as "paid out" or "void" is printed onto the ticket so that the ticket cannot be presented again in a fraudulent attempt to obtain a second payout on a winning ticket.

With conventional systems, the ticket is inserted into a mechanical scanner present at a retail location point-of-sale (POS) or redemption center wherein a mechanical printing unit integral with the scanner brands the ticket with the mark via a heat transfer process. An example of this type of scanner is the WAVE™ lottery terminal from Scientific Games.

Document readers that include a scanner to capture a digital image of the lottery ticket are used in the lottery industry for a variety of reasons. An inexpensive camera, linear sensor, or contact image sensor may be used to provide this image capture functionally. Once the document reader has captured a digital image of the document, various processes and analyses are performed on the document image, including for example to determine if the lottery ticket is authentic by processing/analyzing an optical identifier or other marking provided on the ticket. These processes may include decoding authentication information or other data encoded into an optical signature or barcode. An exemplary document reader is disclosed, for example, in U.S. Pat. No. 8,199,370, which is incorporated by reference herein for all purposes.

With the use of digital camera terminals, however, the ability to read and brand the lottery ticket in a single process is lost. A separate (and relatively expensive) branding device would need to be integrated with the camera terminal. Such a device would also take up valuable space at the POS location counter in the retail establishment.

Thus, the industry is in need of a system and method wherein the branding functionality is carried out with a digital camera terminal without the need for a separate or integrated branding device.

SUMMARY

Objects and advantages of the invention will be set forth in part in the following description, or may be obvious from the description, or may be learned through practice of the invention.

In one exemplary embodiment, the present invention includes a method for generating a branded image of a lottery ticket that depicts the original lottery ticket presented by a patron (player) with a mark indicating that the ticket has been redeemed and is thus void. The method will typically commence upon a patron presenting the lottery ticket at a terminal that includes a digital image capture device. The terminal may be located, for instance, at a point-of-sale (POS) location in a retail establishment. The method includes capturing a digital image of the lottery ticket with the digital image capture device at the terminal and presenting the digital image of the lottery ticket on a display, such as a video screen or monitor. The method includes modifying the digital image of the lottery ticket on the display to include a branding mark indicating that the lottery ticket has been presented for redemption and is thereafter void. This branding mark can be virtually any type of visually apparent graphic or word mark. The method includes printing a copy of the modified digital image of the lottery ticket using a printer configured at the terminal and presenting the modified digital image of the lottery ticket to the patron.

In a particular embodiment, the digital image capture device is a digital camera integral within the terminal. The digital camera, display, and printer may be configured in communication with a controller integral within the terminal or otherwise in communication with the terminal.

An embodiment of the method may include generating an instruction on the display requesting the patron to interact with the terminal to confirm that the lottery ticket has been presented by the patron for redemption. For example, the instruction may request the patron to provide such confirmation by signing or marking within an area indicated on the display. The method may include further modifying the digital image of the lottery ticket to also include the confirmation signature or mark provided by the patron.

Another embodiment of the method may include generating and storing an electronic record of the modified digital image of the lottery ticket prior to printing the modified digital image of the lottery ticket.

In still another embodiment, the method may include generating and storing an electronic record of the printed modified digital image of the lottery ticket by capturing an image of the printed modified digital image of the lottery ticket with the image capture device.

The original lottery ticket presented by the patron may be handled or processed in various ways. For example, the lottery ticket may be retained by an operator (e.g., retail clerk or employee) and subsequently forwarded to a central lottery facility or administrator. The original lottery ticket may be manually marked by the operator to indicate that the ticket has been redeemed and is thereafter void. A particular embodiment of the method may include generating and storing an electronic record of the marked or altered original lottery ticket by capturing an image of the marked or altered lottery ticket with the image capture device. This record may be transmitted to the central lottery facility or administrator.

The present invention also encompasses various embodiments of a system for generating a branded image of a lottery ticket that is presented by a patron for redemption. The system may include a terminal having a digital image capture device, a display, and a printer in communication with the digital image capture device. A controller is in communication with the display, the printer, and the digital image capture device. The controller is configured to enable the methods discussed above, including: capturing a digital image of the lottery ticket with the digital image capture device and presenting the digital image of the lottery ticket on the display; modifying the digital image of the lottery ticket on the display to include a branding mark indicating that the lottery ticket has been presented for redemption and is thereafter void; and printing a copy of the modified digital image of the lottery ticket that is presented to the patron.

In a particular embodiment, the digital image capture device is a digital camera.

In a certain embodiment, the controller is further configured to generate an instruction on the display requesting the patron to interact with the terminal to confirm that the lottery ticket has been presented by the patron for redemption. For example, the instruction may request that the patron provide their signature or other type of identification mark by interfacing with the display. In this embodiment, the controller may be configured to further modify the digital image of the lottery ticket to include the signature or mark provided by the patron and to generate and store an electronic record of the modified digital image of the lottery ticket (with the signature or other identifying mark) prior to printing the modified digital image of the lottery ticket.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 is a schematic view of components of a system in accordance with aspects of the invention;

FIG. 4A depicts a lottery ticket that may be presented by a patron to initiate the method of the invention;

FIG. 4B depicts a digital image of the lottery ticket of FIG. 4A presented on the terminal display;

DETAILED DESCRIPTION

Figure 1:
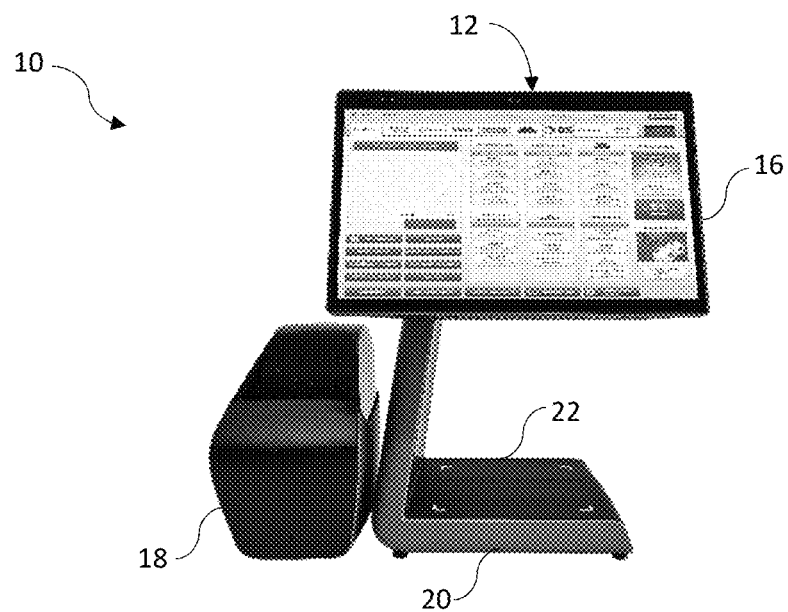
FIG. 1 is a front perspective view of a terminal for use in method and system embodiments of the invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Figure 2:
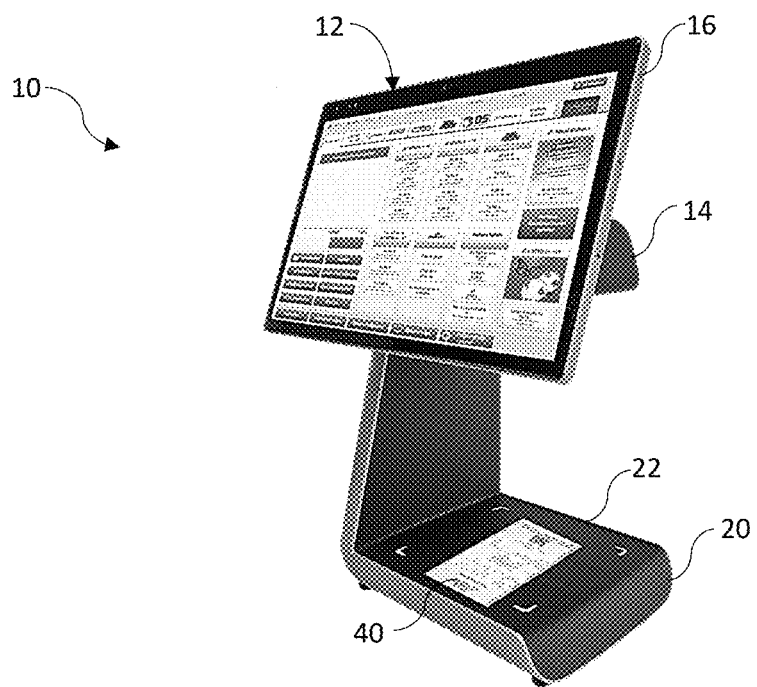
FIG. 2 is a side perspective view of the terminal of FIG. 1.

With reference now to FIGS. 1 and 2, an embodiment of a lottery ticket terminal 12 is depicted that may be used with a system 10 and method embodiments 100 (FIG. 9) of the invention. Conventional lottery ticketed terminals are typically located at a point-of-sale (POS) at a retail establishment. The terminal 12 includes a base 20 that may also serve to define a platen 22 for placement of a lottery ticket 40 presented by a patron. The terminal 12 includes an interactive display 16 that provides an interface means for an operator to operate the terminal 12 via prompts presented on the display 16, which functions as a control panel 28 (FIG. 3) and display monitor. The terminal 12 also includes a digital image capture device 14 (FIG. 2) oriented towards the platen 22 in order to capture and generate a digital image of the lottery ticket 40 placed on the platen 22. A printer 18 is also configured with the terminal 12 and may be a stand-alone unit or may be an integral component of the terminal 12.

It should be appreciated that the terminal 12 may have any manner of configuration within the scope and spirit of the invention, wherein the embodiment depicted in FIGS. 1 and 2 is for exemplary purposes only.

It should also be appreciated that the method 100 and system 10 are not limited to a particular type of lottery ticket and may be used for various conventional lottery tickets and other documents, including on-line lottery tickets, scratch off lottery tickets that have been scratched or have not been scratched, scratch game booklets, lottery game coupons, lottery game receipts, admission tickets, delivery slips, receipts, bet slips, or any other document.

In a particular embodiment, the digital image capture device 14 may be a camera-based document reader that utilizes a digital camera to capture an image of a document placed on the platen 22 or otherwise presented to the terminal. The digital camera used to scan the lottery ticket 40 may be, for example, a 5-megapixel digital color camera and may be configured to provide a resolution of more than 12 dots per millimeter for the document place in the document reading area (within the marks) of the platen 22.

Although not depicted in FIGS. 1 and 2, the terminal 12 may include an enclosure designed to reduce or eliminate white ambient light noise from the document reading area. The terminal 12 may also have a configuration adapted to facilitate proper placement of the lottery ticket 40 in/on the document reader area of the platen 22 (or within an enclosure. In addition, the terminal 12 may also utilize two cameras 14 mounted side-by-side to capture and process document images to accomplish one or more of the following: a) reduce or eliminate glare; b) reduce errors induced by a bent or bowed document; or c) enable multi-spectral scanning of the same document at the same time.

The terminal 12 also includes an integral controller, which may be housed, for example, in the base 20 or in the display 16. Control aspects of the terminal 12 (and overall system 10) are depicted in FIG. 3.

Referring to FIG. 3, the image capture device 14 (e.g., a digital camera) may be interfaced to a reader electronics board 25 where image processing is performed by a controller 24 designed to accommodate data feeds from multiple sources. The operation of the digital camera 14 may be directly controlled through controller 24. The digital camera may be controlled to perform various functions and invoke numerous features, as described herein.

Still referring to FIG. 3, control aspects of the terminal 12 may also include a database 35, the display 16, the control panel 28, a network interface 30, and the image capture device 14, which, as discussed above, may be a digital camera or any other device used to capture an image of the lottery ticket 40 or other document presented to the terminal. The image capture device 14 may also include one or more sets of LEDs or other light sources used to generate varying types of images of the document.

As illustrated in FIG. 3, the controller 24 may include a memory 32 for storing programs and routines, a microprocessor 34 for executing stored routines, random access memory (RAM) 36, and an input/output (I/O) bus 38. In a particular embodiment, the controller may be a high performance convergent multimedia Blackfin processor, from Analog Devices. This image processor operates at 400 MHz/1,000 MMACS (Millions of Multiply Accumulates) with two independent DMA controllers. It also features multiple enhanced parallel peripheral interfaces (EPPI), which are used to interface directly with the digital camera, as well as a pixel compositor hardware accelerator.

The controller 24 is interfaced with the database 35, which may document classification data unique to each particular class of lottery ticket or document to be scanned or read by the terminal 12. This document classification data may include, for example, an optical signature associated with the particular document, geometric data associated with the document, such as area, length, and width of the document, and document type. In the case of lottery tickets, the document classification data may include information such as type of lottery game embodied in the document and game number associated with the document. The document classification data is used by the controller 24 to perform the digital image modifications described herein.

Referring to FIG. 4A, conventional lottery tickets include unique identification marks or data, such as a barcode, optical pattern, serial number, and so forth, that are used to validate and authenticate the lottery ticket 40, as is well-known in the industry. The terminal 12 is also configured to perform these conventional processes and may be networked with a central lottery office or administrator for such purposes.

FIG. 4A depicts an example of a lottery ticket 40 (also referred to as a "receipt") that may be issued to a patron for playing a conventional draw-type lottery game. In the event that the lottery ticket 40 is a winning ticket, the patron may present the lottery ticket for validation and redemption at a retail establishment authorized for such purposes or a lottery redemption center, either of which may use the terminal 12 described herein to generate an initial digital image 42 of the lottery ticket 40, as depicted in FIG. 4B. The initial digital image 42 may be displayed on the display 16 of the terminal 121 or on another monitor or display configured in communication with the terminal 121.

Figure 5A:
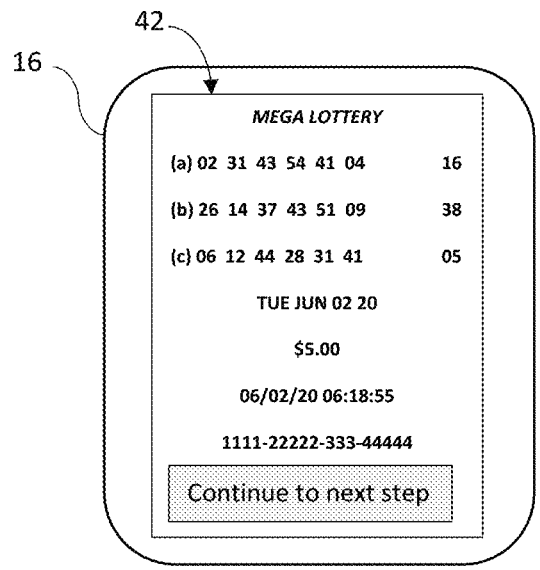
FIG. 5A depicts the digital image of FIG. 4B with an instruction to the operator.
Figure 5B:
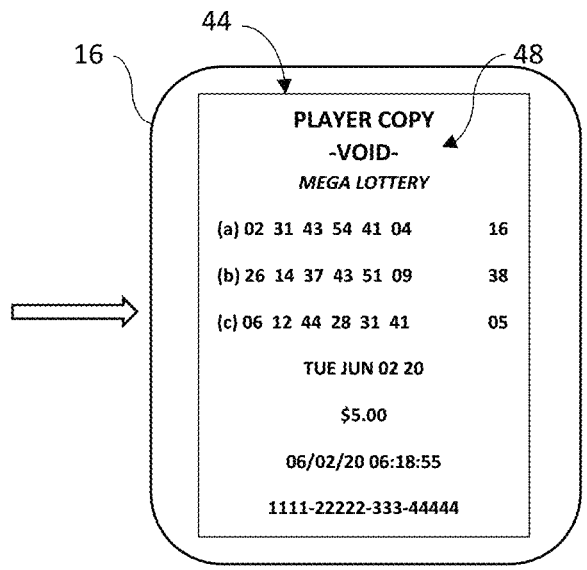
FIG. 5B depicts the digital image of 4B modified to contain a branding mark.

In FIG. 5A, the operator is prompted to proceed with the process once the digital image 42 has been generated and presented on the display 16. Instructions will be provided via prompts on the control panel 28 to modify the initial digital image 42 with a branding mark 48 that visually indicates that the lottery ticket 40 has been presented for redemption and is thereafter void. The branded lottery ticket may be considered as a modified digital image 44 (FIG. 5B) of the initial lottery ticket 40 The control panel 28 may be considered as the functional portion of the display 16 that provides control prompts and instructions to the operator. In other words, the display (i.e., monitor) 16 provides the functions of displaying images and control options/instructions to the operator. As depicted in FIG. 5B, this branding mark 48 can be virtually any type of visually apparent graphic or word mark. The method may include printing a copy of the modified digital image 44 of the lottery ticket using the printer 18 configured at the terminal 12 and presenting the modified digital image 44 of the lottery ticket to the patron.

Figure 6A:
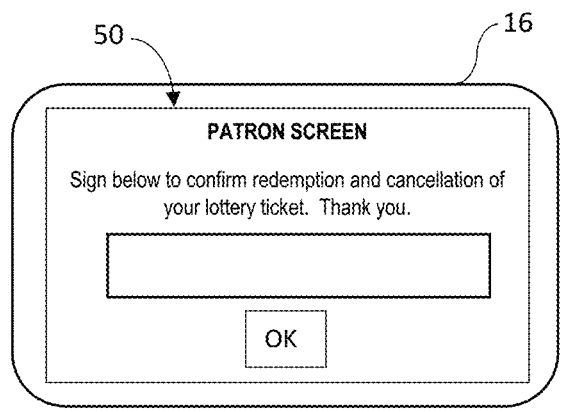
FIG. 6A is an instruction on the display requesting the patron to provide a confirmation mark.
Figure 6B:
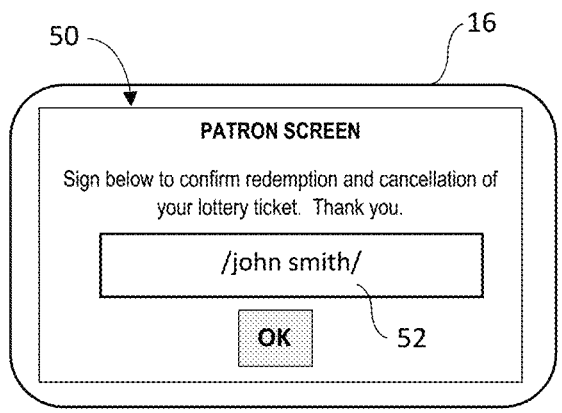
FIG. 6B indicates a signature provided by the patron after interaction with the request of FIG. 6A on the display screen.

Referring to FIGS. 6A and 6B, an embodiment of the method may include generating an instruction 50 on the display 16 requesting the patron to interact with the terminal 12 to confirm that the lottery ticket 40 has been presented by the patron for validation/redemption. For example, the instruction may request the patron to provide such confirmation by signing or marking within an area indicated on the display, as in FIGS. 6A and 6B.

Figure 7A:
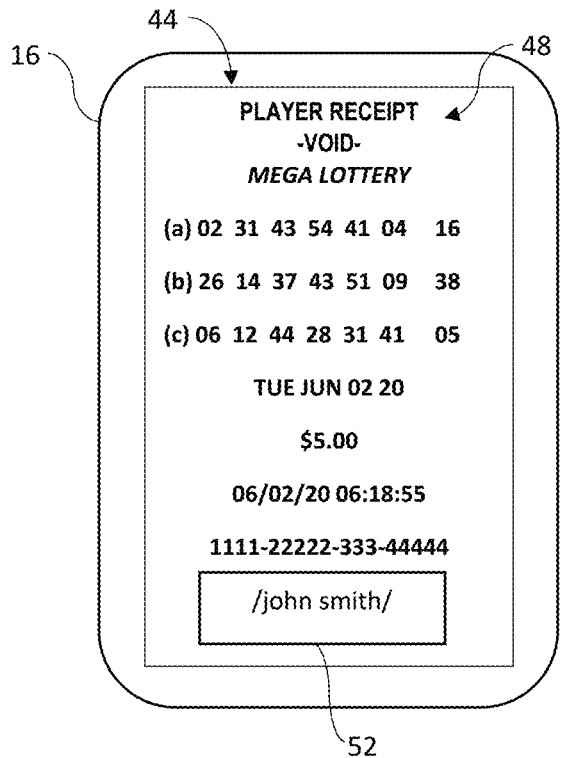
FIG. 7A indicates the image of FIG. 5B modified further to include the confirmation mark of FIG. 6B.
Figure 7B:
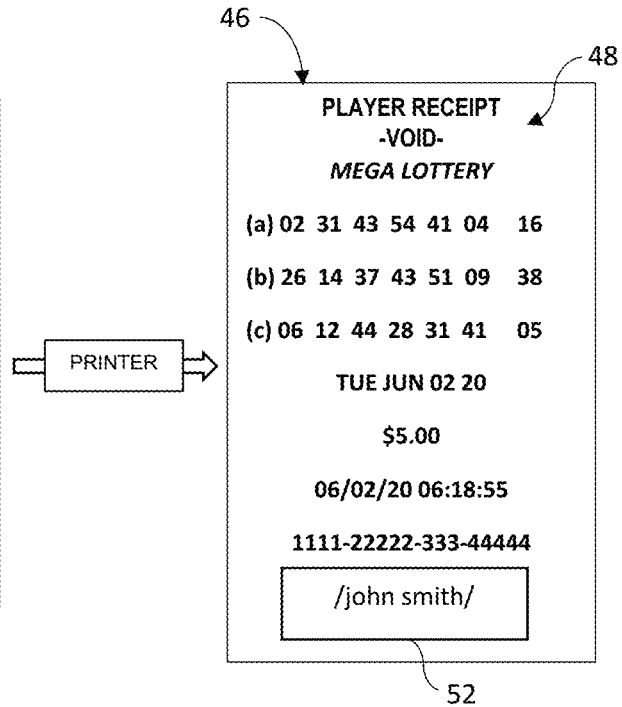
FIG. 7B is a printed copy of the modified digital ticket image of FIG. 7A.

Referring to FIGS. 7A and 7B, the method may include further modifying the modified digital image 44 of the lottery ticket to also include the confirmation signature or mark provided by the patron. A printed copy 46 of the further modified digital image 44 of the lottery ticket may then be produced and provided to the patron.

Another embodiment of the method may include generating and storing an electronic record of the modified digital image of the lottery ticket prior to printing the modified digital image of the lottery ticket.

In still another embodiment, the method may include generating and storing an electronic record of the printed modified digital image of the lottery ticket by capturing an image of the printed modified digital image of the lottery ticket with the image capture device.

Figure 8:
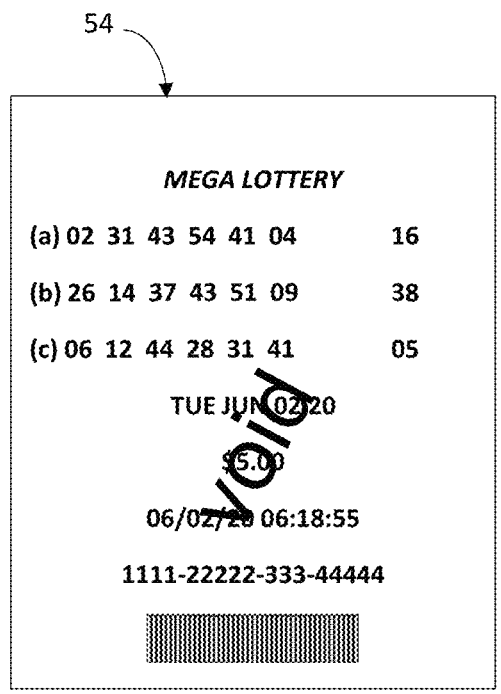
FIG. 8 depicts the original lottery ticket of FIG. 4A with a manually applied redemption/void mark.

The original lottery ticket presented by the patron may be handled or processed in various ways. For example, the lottery ticket may be retained by an operator (e.g., retail clerk or employee) and subsequently forwarded to a central lottery facility or administrator. Referring to FIG. 8, the original lottery ticket may be manually marked (e.g., stamped or written on) by the operator to produce a voided/marked ticket 54 that clearly and visually indicates that the original ticket has been redeemed and is thereafter void. A particular embodiment of the method may include generating and storing an electronic record of the marked or altered original lottery ticket by capturing an image of the marked or altered lottery ticket with the image capture device. This record may be transmitted to the central lottery facility or administrator.

The present invention also encompasses various embodiments of the system 10 for generating a branded image 44 of a lottery ticket that is presented by a patron for redemption. The components and operation of the system 10 are discussed above and may include the terminal 12 having the digital image capture device 14, display 16, and printer 18 in communication with the digital image capture device 14. The controller 24 is in communication with the display 16, printer 18, and digital image capture device 14, and is configured to enable the methods discussed above.

Figure 9:
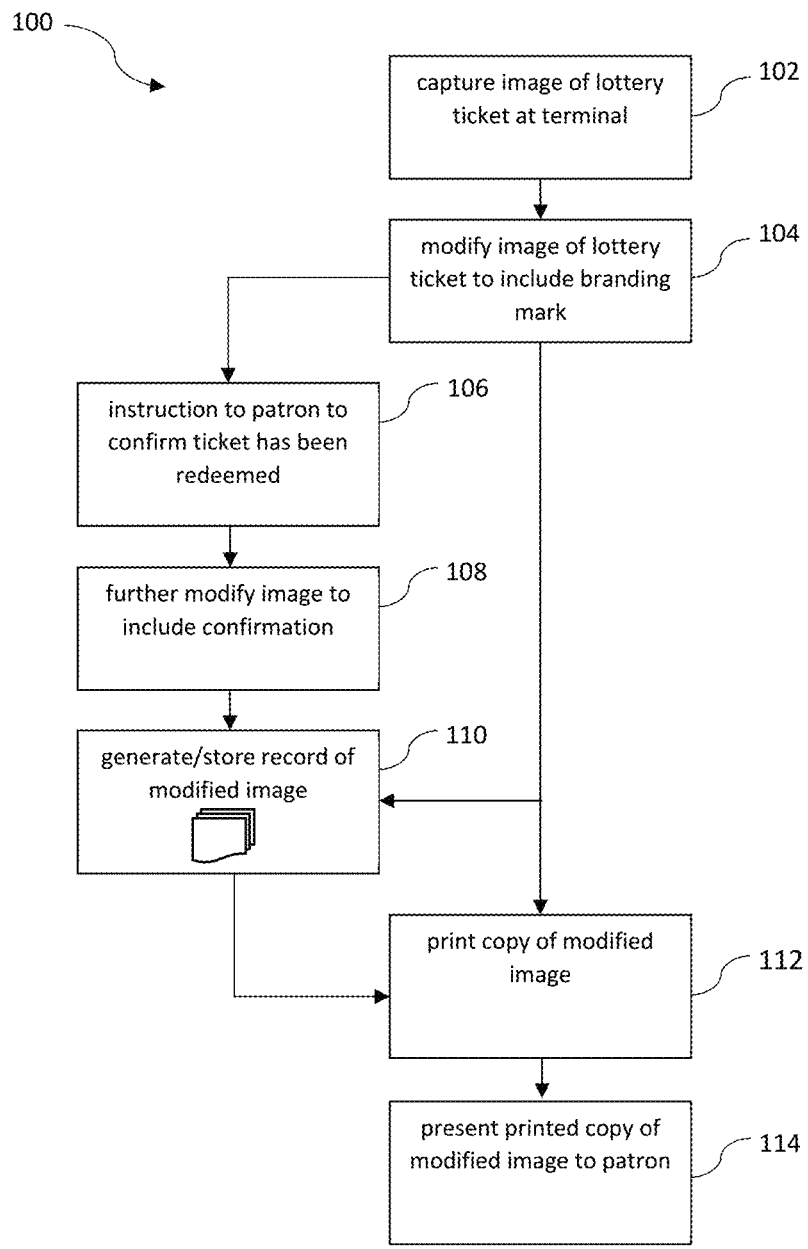
FIG. 9 is a flow chart of various method embodiments in accordance with the invention.

FIG. 9 depicts embodiments of the method 100 generally discussed above. At step 102, the initial/original lottery ticket is presented by a patron to an operator of the lottery terminal for validation/redemption.

At step 104, an initial digital image of the lottery ticket is generated and then modified to include the branding mark indicating that the lottery ticket has been redeemed and is thus thereafter void. At this time, the method may proceed directly to step 112 where the modified digital image of the lottery is printed and provided to the patron.

The method 100 may also include step 110 subsequent to step 104 wherein an electronic file/record of the modified digital image of the lottery ticket is generated and stored in a memory for any number of reasons, including accountability, security, transactional history, and so forth. This record may be transmitted to the central lottery facility or administrator.

An embodiment of the method 100 may include step 106 wherein the patron is asked to provide a confirmation mark (e.g., signature or other identifying mark) on the modified digital image of the lottery ticket via the terminal.

At step 108, the modified digital image of the lottery ticket may then be further modified to include the confirmation mark.

At step 110, an electronic file/record of the modified digital image of the lottery ticket including the confirmation mark may be generated and stored in memory, as discussed above.

Step 114 indicates that the printed copy of the modified digital image of the initial lottery ticket is provided to the patron.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for generating an image of a lottery ticket with a branding mark indicating that the lottery ticket was presented for redemption and is thereafter void, wherein the lottery ticket is presented by a patron at a terminal having a digital image capture device, the method comprising:
    at the terminal, capturing a digital image of the lottery ticket with the digital image capture device and presenting the digital image of the lottery ticket on a display;
    modifying the digital image of the lottery ticket on the display to include a branding mark indicating that the lottery ticket has been presented for redemption and is thereafter void;
    at the terminal, printing a copy of the modified digital image of the lottery ticket; and
    presenting the printed copy of the modified digital image of the lottery ticket to the patron.

2. The method as in claim 1, wherein the digital image capture device is a digital camera integral within the terminal, the digital camera and the display in communication with a controller.

3. The method as in claim 1, further comprising generating an instruction on the display requesting the patron to interact with the terminal to confirm that the lottery ticket has been presented by the patron for redemption.

4. The method as in claim 3, wherein the instruction requests the patron to provide the confirmation by signing or marking within an area indicated on the display.

5. The method as in claim 4, wherein the digital image of the lottery ticket is further modified to include the signature or mark provided by the patron, and the printed copy of the modified digital image of the lottery ticket presented to the patron includes the signature or mark.

6. The method as in claim 1, further comprising generating and storing an electronic record of the modified digital image of the lottery ticket prior to printing the modified digital image of the lottery ticket.

7. The method as in claim 6, further comprising generating and storing an electronic record of the printed modified digital image of the lottery ticket by capturing an image of the printed modified digital image of the lottery ticket with the image capture device.

8. The method as in claim 1, further comprising an operator of the terminal retaining the lottery ticket after the modified digital image of the lottery ticket is printed and presented to the patron.

9. The method as in claim 8, wherein the operator manually marks or alters the lottery ticket to present subsequent presentation of the lottery ticket for redemption.

10. The method as in claim 9, further comprising generating and storing an electronic record of the marked or altered lottery ticket by capturing an image of the marked or altered lottery ticket with the image capture device.

11. A system for generating a branded image of a lottery ticket presented by a patron for redemption, the system comprising:
    a terminal, the terminal having a digital image capture device, a display, and a printer in communication with the digital image capture device;
    a controller in communication with the display and the digital image capture device, the controller configured to enable:
        capturing a digital image of the lottery ticket with the digital image capture device and presenting the digital image of the lottery ticket on the display;
        modifying the digital image of the lottery ticket on the display to include a branding mark indicating that the lottery ticket has been presented for redemption and is thereafter void; and
        printing a copy of the modified digital image of the lottery ticket that is presented to the patron.

12. The system as in claim 11, wherein the digital image capture device comprises a digital camera.

13. The system as in claim 11, wherein the controller is further configured to generate an instruction on the display requesting the patron to interact with the terminal to confirm that the lottery ticket has been presented by the patron for redemption.

14. The system as in claim 13, wherein the controller is further configured to further modify the digital image of the lottery ticket to include a signature or mark provided by the patron and to generate and store an electronic record of the modified digital image of the lottery ticket prior to printing the modified digital image of the lottery ticket that includes the signature or mark.

* * * * *